May 28, 1968            D. S. WILLARD            3,385,978
SYSTEM FOR DISTINGUISHING A COMMAND SIGNAL USING
DUAL LEVEL DETECTION
Filed Nov. 19, 1964

INVENTOR.
DAVID S. WILLARD
BY Harry A. Herbert Jr.
and George Fine
ATTORNEYS

United States Patent Office 3,385,978
Patented May 28, 1968

3,385,978
SYSTEM FOR DISTINGUISHING A COMMAND
SIGNAL USING DUAL LEVEL DETECTION
David S. Willard, High Rolls, N. Mex., assignor to the
United States of America as represented by the Secretary of the Air Force
Filed Nov. 19, 1964, Ser. No. 412,579
4 Claims. (Cl. 307—235)

ABSTRACT OF THE DISCLOSURE

A system for distinguishing a command signal from interfering heterodyning signals by dual level detection and pulse analysis. The detector includes an input transformer with each terminal of the secondary connected to a pair of diodes which are one each connected to a pair of transistors biased at different levels and with one transistor having degenerative feedback.

The invention described herein may be manufactured and used by or for the United States Government for governmental purposes without payment to me of any royalty thereon.

This invention relates to analyzing radio signals and more particularly to the analysis of pulses emanating from dual outputs of a detector.

In radio control of command instrumentation, one type of command used is a keyed series of audio frequency signals which when detected form a repetitious series of pulses with specific On and Off durations. Such a signal when used with a proper pulse analyzer can identify the desired command signal and provide the proper command function. However, a shortcoming of this type of system is that it is possible for two interfering signals to combine or heterodyne and produce a false command signal. The purpose of this invention is to provide a means of detection that will reject interfering heterodyning signals.

Therefore, an object of this invention to provide a system for analyzing radio signals.

It is another object to provide a method of distinguishing a given signal from a similar signal caused from two interfering signals.

These and other advantages, features and objects of the invention will become more apparent from the following description taken in connection with the illustrative embodiment in the accompanying drawings, wherein.

Figure 1:
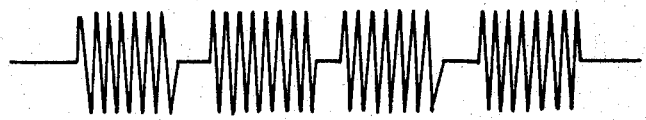
FIGURE 1 shows the wave pattern of the desired signal.
Figure 2:
FIGURE 2 shows the detected pulse formed from the wave pattern shown in FIGURE 1.
Figure 3:
FIGURE 3 shows the wave form produced from two undesired heterodyning signals.
Figure 4:
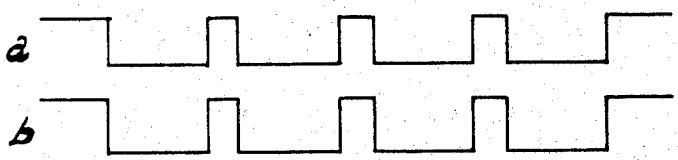
FIGURE 4 shows the dual output from the desired signal.
Figure 5:
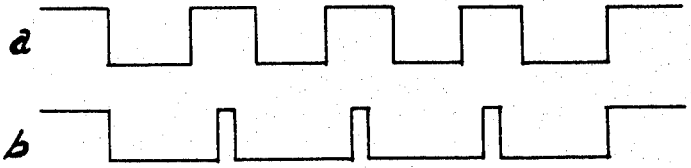
FIGURE 5 shows the dual output from the undesired signal.

The desired signal could appear as shown in FIGURE 1. FIGURE 2 shows the signal of FIGURE 1 after detection leaving square wave pulses. Two heterodyning signals could produce an undesired signal as shown in FIGURE 3 with the characteristic that its wave front is always sloping. Depending upon the phasing, amplitude, frequency, and detection level of the undesired heterodyning signals it is possible to obtain a detected pulse identical with the desired signals detected pulse. But detecting at two levels and comparing outputs, the desired signal produces identical wave shapes in each output as shown in FIGURES 4a and 4b. Whereas the heterodyning undesired signals produces outputs of different On-Off durations as shown in FIGURES 5a and 5b. This allows a pulse analyzer to reject the undesired signal.

Figure 6:
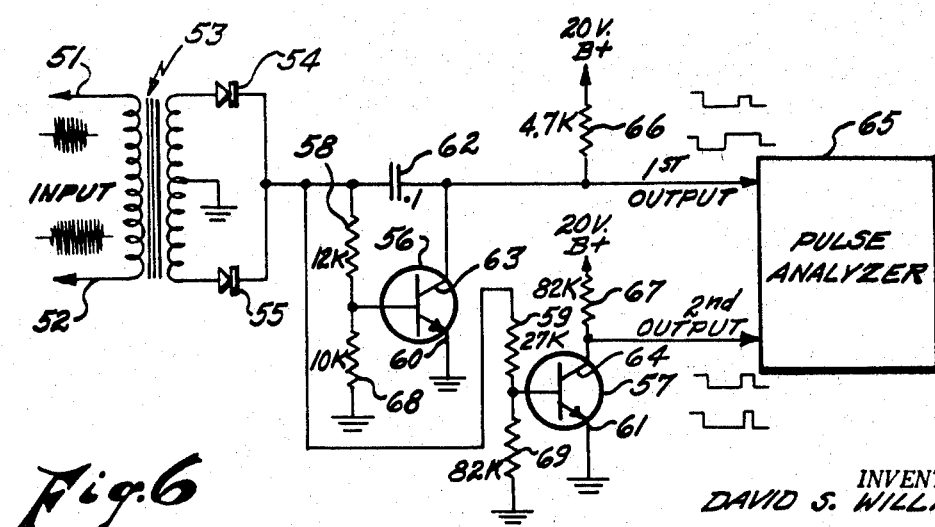
FIGURE 6 shows a circuit diagram of a dual level detector including values of circuit components.

FIGURE 6 shows the circuit diagram of the dual level detector. The signal is introduced at terminals 51 and 52 of transformer 53 and is rectified by diodes 54 and 55. The signal is then fed to the circuit comprising transistors 56 and 57 through resistors 58 and 59, respectively. The supply voltage is applied at collectors 63 and 64 through load resistors 66 and 67. Biasing resistors 58 and 68 associated with transistor 56 have different values than biasing resistors 59 and 69 associated with transistor 57 as shown causing detection to occur at different levels for respective transistors. Transistors 56 and 57 will conduct, and will only conduct, when an input signal passing through transformer 53 is large enough to surpass threshold requirements of diodes 54 and 55, the base to emitter threshold requirements of transistors 56 and 57, and the voltage divider effect of resistors 58, 68, 59, and 69. Since the input signals as shown in signals 1 and 3 are larger than the output signals, and as there is considerable voltage gain in transistors 56 and 57, then the output voltage of collectors 63 and 64 should normally reach supply voltage limitation from zero to the B+ voltage and be reduced by the loading effects of any following circuitry. Emitters 60 and 61 are grounded and capacitor 62 is interposed between collector 63 of transistor 56 and resistor 58. Capacitor 62 provides degenerative feed-back that eliminates ripple from the first output. The two outputs are taken from collectors 63 and 64 of the transistors 56 and 57, respectively. Each of the two outputs can then be analyzed by pulse analyzer 65. As an example of such pulse analyzer, reference is made to my United States Patent No. 3,263,096 filed on Mar. 24, 1964 and issued on July 26, 1966.

What I claim is:

1. A system for distinguishing a command signal from interfering heterodyning signals by analyzing a first and second pair of square wave pulse trains, the first pair being representative of the command signal and the second pair being representative of the interfering heterodyning signal, the system comprising:
    (a) a dual level detector including means for introducing the signals to the detector and a pair of outputs each having a different level, each of the outputs being in the form of a square wave pulse train;
    (b) and pulse analyzer means for determining the equality of the outputs.

2. A system for distinguishing a command signal from interfering heterodyning signals by analyzing a first and second pair of square wave pulse trains, the first pair being representative of the command signal and the second pair being representative of the interfering heterodyning signal, the system comprising:
    (a) a dual level detector including a transformer having input terminals for introducing the signal and a pair of output terminals, a pair of diodes connected to the output terminals of the transformer, a pair of transistors each of the pair having a base for feeding the signal from the transformer and each of the pair having a collector, and pair of outputs taken from the collectors;
   (b) and pulse analyzer means for determining the equality of the outputs.

3. A system according to claim 2 which further comprises means for biasing the pair of transistors using biasing resistors that vary for each of the pair causing detection at different levels.

4. A system according to claim 2 which further comprises a capacitor connecting the base of one of the transistors to the emitter to provide degenerative feedback.

References Cited

UNITED STATES PATENTS

| 2,453,958 | 11/1948 | Andresen | 329—166 X |
| 2,820,895 | 1/1958 | Johnstone | 328—117 |
| 2,996,613 | 8/1961 | Glomb | 328—117 X |

JOHN S. HEYMAN, *Primary Examiner.*